United States Patent [19]

Lovisek

[11] 4,350,465
[45] Sep. 21, 1982

[54] SPIDER WASHER HEAD SCREW

[75] Inventor: Louis J. Lovisek, Greenlawn, N.Y.

[73] Assignee: Industrial Fasteners Corp., Port Washington, N.Y.

[21] Appl. No.: 144,702

[22] Filed: Apr. 28, 1980

[51] Int. Cl.³ ............................................. F16B 39/26
[52] U.S. Cl. ..................................... 411/186; 411/165
[58] Field of Search ............... 151/37, 35, 38; 85/9 R; 411/186, 185, 188, 187, 184, 189, 165, 163, 164, 162, 161, 160

[56] References Cited

U.S. PATENT DOCUMENTS

| | | | |
|---|---|---|---|
| 1,938,399 | 12/1933 | Olson | 151/35 |
| 2,226,491 | 12/1940 | Gustafson | 151/37 |
| 2,266,555 | 12/1941 | Jordan et al. | 151/35 X |
| 3,343,580 | 9/1967 | Coldren | 151/37 |

Primary Examiner—Ramon S. Britts

Attorney, Agent, or Firm—Blum, Kaplan, Friedman Silberman & Beran

[57] ABSTRACT

A screw having a head and a body defining an axis of rotation extending downwardly from the head and formed integrally therewith is provided with a flange extending radially and downwardly from the head about the upper end of the body. The flange is slotted to define a plurality of deformable tabs joined at their respective bases to the head. At least a portion of each tab is twisted relative to its base about an axis extending along the flange radially from the axis of rotation in a direction so that an edge of each tab defined by the slots, the edge being on the side of the tab facing in the direction of rotation of the screw for removal, projects downwardly. The respective ends of the edge lie in essentially a single plane extending normally to the axis or rotation, the bottom surface of the tabs defining an essentially straight line in radial cross-section except in the region of twist.

8 Claims, 10 Drawing Figures

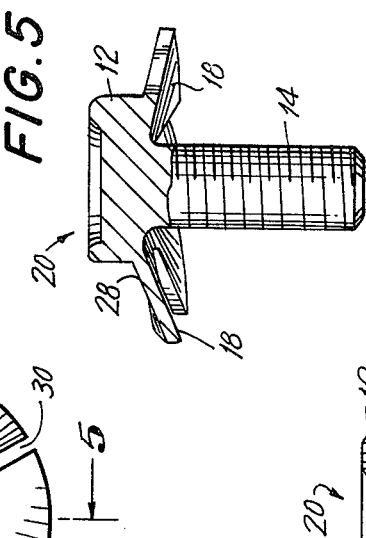
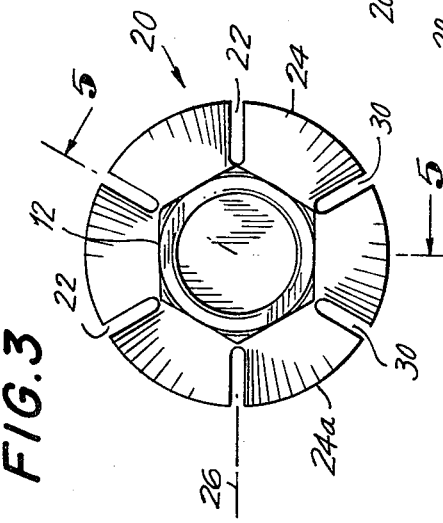
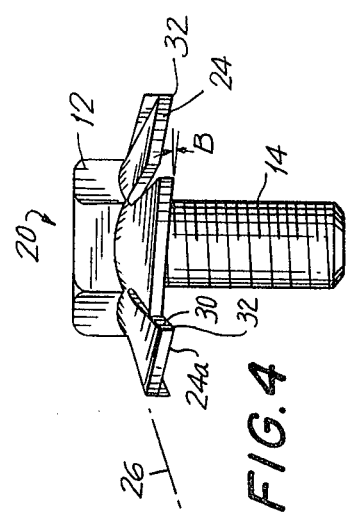
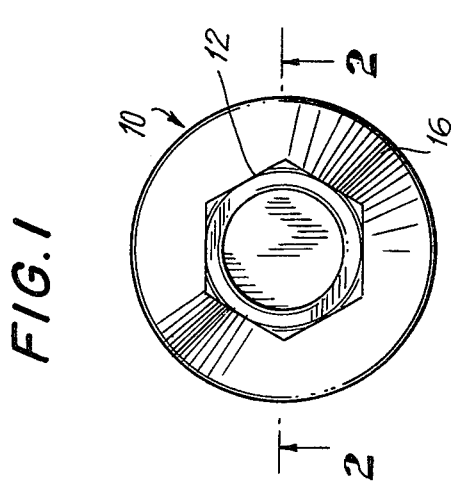
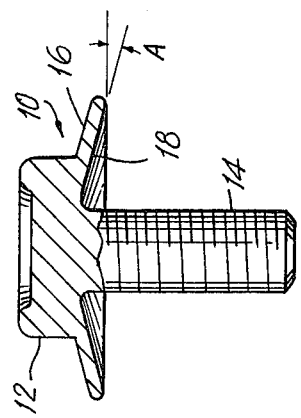

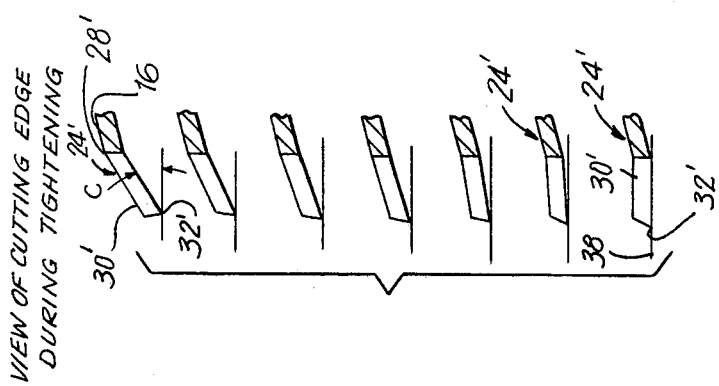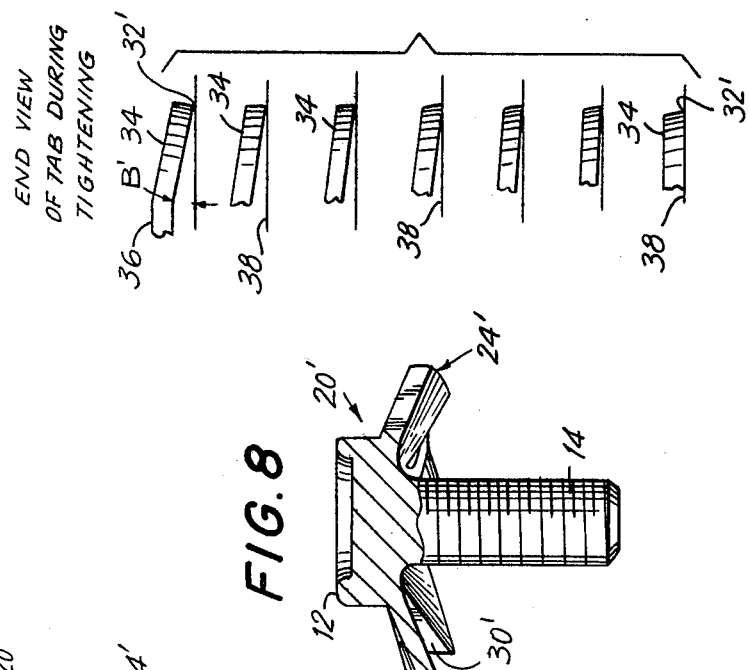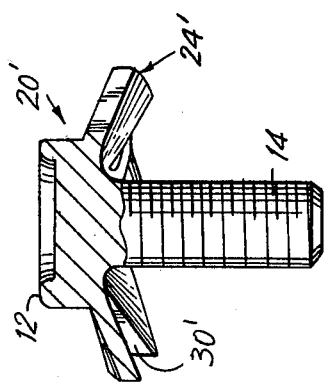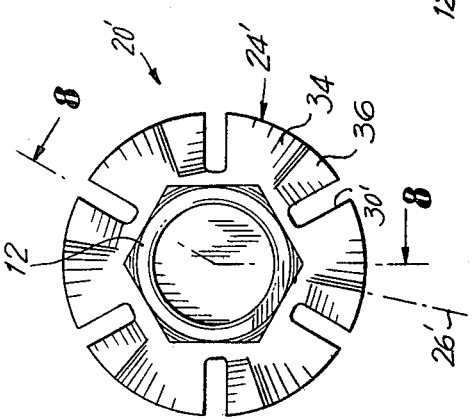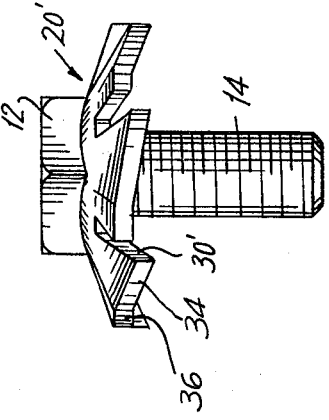

SPIDER WASHER HEAD SCREW

BACKGROUND OF THE INVENTION

This invention relates generally to screws having a self-fastening feature. The purpose of a self-fastening feature in a screw is to prevent undesired loosening of a screw engaged in a workpiece due to vibration and other factors. In the art, the primary self-locking vehicle is a lockwasher positioned intermediate the head of the screw and the surface of the workpiece. The lockwasher may be provided with teeth of various configurations which engage in the surface of the workpiece to hold the screw.

The "teeth" on the lockwasher are usually deformable during engagement to provide a bias on the screw threads to increase the holding forces tending to hold the screw in position. Lockwashers have proved less than completely satisfactory because of the expense of separate parts and the use thereof and because of the possibility of some relative rotation between the lockwasher and the screw, the screw not being affirmatively held. A variation in the use of lockwashers is to capture a lockwasher on the body of the screw adjacent the head. The lockwasher is still displaceable relative to the screw and this arrangement has likewise not proved completely satisfactory.

In the Art, it has been proposed to form tabs in flanges projecting radially from the head of the screw to serve the lockwasher function. Thus, in U.S. Pat. No. 2,226,491, it is proposed to twist a dome-shaped flange (FIGS. 4-6) or a planar flange (FIGS. 7-9). In the former case the dome-shape of the tabs prevents proper distortion during use while the planar tab provides insufficient retaining force. In U.S. Pat. No. 3,343,580 is proposed to twist a planar flange so that the lowermost projections of the tabs define a sinusoidal envelope, an arrangement that does not provide maximum uniform force.

Neither of the foregoing arrangements have achieved acceptance in the market place and neither have proved completely satisfactory. By providing a screw having flanges integrally formed with the head and by forming the flanges as more particularly described below, the deficiencies of the prior art have been avoided and a new and highly effective self-locking screw is provided.

SUMMARY OF THE INVENTION

Generally speaking, in accordance with the invention, a screw is provided having a head, a body defining an axis of rotation, said body extending downwardly from the head and formed integrally therewith, and a flange formed integrally with and extending radially and downwardly from said head, said flange being slotted to define a plurality of deformable tabs joined at their respective bases to said head, at least a portion of each tab being twisted relative to its base about an axis extending radially from said axis of rotation along the flange in a direction so that an edge of each of the tabs defined by the slots inclines downwardly, said edge being on the side of the tab facing in the direction of rotation of said screw for removal thereof, respective ends of said edges of said tabs essentially lying in a single plane extending normally to the axis of rotation, the bottom surface of the tabs defining an essentially straight line in radial cross-section except in the region of twist.

Accordingly, it is an object of this invention to provide a spider washer head screw adapted to be self-locking and to provide security against loosening of the screw due to vibration and the like.

Another object of the invention is to provide a self-locking screw integrally formed and readily manufacturable which provides effective resistance to loosening when engaged in a workpiece.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a top plan view of a blank from which the spider washer head screw in accordance with the invention can be formed;

FIG. 2 is a partially sectioned side elevational view taken along lines 2—2 of FIG. 1;

FIG. 3 is a top plan view of a first embodiment of the spider washer head screw in accordance with the invention;

FIG. 4 is a side elevational view of the spider washer head screw of FIG. 3;

FIG. 5 is a partially sectioned view taken along lines 5—5 of FIG. 3;

FIG. 6 is a top plan view of a second embodiment of the spider washer head screw in accordance with the invention;

FIG. 7 is a side elevational view of the screw of FIG. 6;

FIG. 8 is a partially sectioned view taken along lines 8—8 of FIG. 6;

FIG. 9 is a sequential showing of the end of the tab of the embodiment of FIG. 6 during tightening; and FIG. 10 is a sequential showing of the cutting edge of the tab of the embodiment of FIG. 6 during tightening.

DESCRIPTION OF THE PREFERRED EMBODIMENTS

Referring to FIGS. 1 and 2, the screw blank 10 depicted consists of a head 12 formed integrally with a downwardly projecting body 14 which is shown threaded. As used in this application, the term "downwardly" refers to the direction projecting from the base of head 12 along the direction of the axis of rotation of the screw to be formed from blank 10. A radially and downwardly extending flange 16 is formed integrally with head 12 and is provided with a conical bottom surface 18, as more particularly shown in FIG. 2, defining an essentially straight line in radial cross-section. Bottom surface 18 of flange 2 defines an angle A with a plane extending normally to the axis of rotation which may fall in the range of between about 5 degrees to about 30 degrees. In one embodiment, an angle of 15 degrees has proved particularly effective.

While the head 12 is shown, by way of example, shaped hexagonally for cooperation with a suitably shaped socket wrench, any known head-shape or configuration may be used, including a slotted head and a Phillips head. However, while the body 14 is shown having a conventional configuration, any configuration may be utilized, including any of the self-tapping screw constructions which are available. Further, while the blank is shown threaded, the threading may be added before or after the flange is shaped in accordance with the invention as more particularly described below.

Referring now to FIGS. 3–5, the spider washer head screw 20 depicted is formed from blank 10 and like reference numerals are applied to like elements. Flange 16 is formed with a plurality of radially extending slots 22 defining tabs 24. Slots 22 must have sufficient width to permit the displacement of the tabs 24 during tightening of the screw, and therefore cannot represent merely the slits which would be formed by relative shearing of adjacent tabs to define same. If the tabs are defined by mere slits, then adjacent tabs will interfere with each other, preventing full utilization of the deflection of the respective tabs for carrying out the desired self-locking purpose. It has been found that from three to seven essentially equally spaced slots should be provided, defining from four to eight tabs in order to produce the best results.

As more particularly seen in FIGS. 4 and 5, each of the tabs is twisted relative to a base region adjacent the head about an axis extending radially from the axis of rotation of the screw, the axis of twist of tab 24a being shown, by way of example, in FIGS. 3 and 4 by chain lines 26. As is shown in FIG. 5, the bottom surface 18 of the tabs still define an essentially straight line in radial cross-section, except in the region of twist at the base of region 28 (FIG. 5) of the tab.

As is more particularly seen in FIG. 4, the twist imparted to each tab about the axis of twist 26 is in the clockwise direction as viewed in FIG. 4, so that the edge 30 of each tab projects downwardly toward the top surface of a workpiece (not shown) in which the screw is to be driven. The downwardly inclined edge 30 is the edge on the side of the tab which faces in the direction of rotation of the screw for removal, the counter clockwise direction in the embodiment of FIGS. 3–5. The lower ends 32 of edges 30 of the respective tabs lie essentially in a single plane extending essentially normally to the axis of rotation of the screw so as to essentially engage the top surface of the workpiece simultaneously. In this manner, the retaining force is applied uniformly and gradually and each of the tabs is deflected essentially an equal distance during tightening.

As will be more particularly described below in connection with the embodiment of FIGS. 6–8, when screw 20 is fully tightened, the tabs are flattened against the top surface of the workpiece to provide a resilient holding force, tending to hold the screw in place and resist loosening. In one embodiment, the point 32 is deflected during tightening by about 0.03 inch.

The incline of the outer end of the respective tabs 24 is such as to define a camming effect during tightening (clockwise rotation as viewed in FIG. 3) to permit the deflection of the tab. On the other hand, the edge 30 and in particular the end 32 of said edge bites into the surface of the workpiece against which the screw is tightened to resist and prevent loosening. Thus, the spider washer head screw in accordance with the invention offers not only the advantage of the bias forces, but the affirmative interaction between the edge of the tab and the workpiece surface to resist loosening, whether such loosening is caused by vibration, temperature change, load shifting or the like.

Referring now to FIG. 4, the end of each tab is inclined to define an angle B with the plane of points 32. In one embodiment, angle B is about 10 degrees. At an angle of greater than about 45 degrees, the high spring pressure of the tab pressing point 32 into the workpiece could develop so much resistance to movement that either the head would break or the tab itself would collapse and break. This is because the point 32, digging into the workpiece, tends to produce a chip, the larger the chip, the more resistant the screw is to backout movement. On the hand, if angle B were zero degrees, the tab would have the tendency of sliding over the workpiece surface instead of digging in and forming a chip, and accordingly, at least some angle of twist is required in order to insure the desired backout resistance.

Referring now to FIGS. 6–8, like reference numerals being applied to like elements, screw 20' differs from screw 20 of FIGS. 3–5 principally in that less than all of the width of each tab 24' is subjected to twist, the portion being subjected to the twist being the portion adjacent edge 30'. As can be seen in FIG. 6, the axis of twisting is no longer at an edge of the tab, but rather, spaced from said edge as shown by chain line 26'. In other respects, the screw 20' functions in the same manner as screw 20 of FIGS. 3–5. Accordingly, each tab 24' is divided into a twisted portion 34 and an untwisted portion 36. It must be remembered that even the untwisted portion is inclined by the angle A as shown in FIG. 2.

Referring now to FIGS. 9 and 10, a sequential view of the tab during tightening is shown relative to surface 38 of the workpiece. End 32' of edge 30' engages and is cammed against the surface 38, the angle B' being gradually reduced during tightening until the tab is essentially flat against surface 38 as shown in the last stage. FIG. 9 depicts an end view while FIG. 10 depicts a view of the cutting edge 30'. The angle C as viewed in FIG. 10 also reduces to essentially zero during tightening. Since the hypotenuse of the angle C does not change, being defined by the base region 28' of the tab, point 32' moves in an outward radial direction as the screw is tightened. On removal, point 32' moves toward the axis of rotation of the screw, gradually increasing the angles C and B', gradually decreasing the spring pressure on the workpiece. In such releasing motion, point 32' marks the workpiece in a slightly spiraling path so that the point 32' is continually cutting a chip during loosening, always moving into virgin surface areas of the workpiece. For this reason, even after an initial slight loosening, the self-locking feature of the spider washer head screw in accordance with in the invention remains operative.

Accordingly, thermal changes and vibrations of the assembled screw and workpiece are absorbed by the spring action of the tabs. If any longitudinal looseness along the screw is developed, the spring action of the tabs will hold the screw in position. In addition, the resistance to releasing rotation caused by the continual engagement of the point 32' with virgin surface areas of the workpiece serves to additionally prevent undesired rotational release.

An additional advantage of the arrangement in accordance with the invention over the provision of a separate or captured lockwasher is in the case of soft materials such as copper or aluminum bus bars. Where a lockwasher is used, the relatively soft material of the bus bars will permit relative rotation of the screw and the lockwasher even after full tightening, causing stripping of the screw. On the other hand, where the self-locking feature is formed integral with the head, controlled tightening is possible and stripping may be avoided.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A screw having a head; a body defining an axis of rotation, said body extending downwardly from the head and formed integrally therewith; and a flange formed integrally with and extending radially downwardly from said head, said flange being slotted essentially to the base thereof to define a plurality of deformable tabs joined at their respective bases to said head, at least a portion of each tab being twisted relative to its base about an axis extending radially from said axis of rotation along the flange in a direction so that an edge of each of the tabs defined by the slots inclines downwardly, said edge being on the side of the tab facing in the direction of rotation of said screw for removal thereof, the bottom surface of the tabs defining an essentially straight line in radial cross-section except in the region of twist, no portion of said tabs being twisted in an upwardly direction, the thickness of said tabs being selected to permit, when engaged with a workpiece, resilient upward deflection of said tabs to a position extending essentially normally to said body and simultaneous resilient upward deflection of said twisted portions of said tabs to essentially flatten said tabs, so that essentially the entire width and length of the tabs bear on the surface of the workpiece at a fully tightened position.

2. A screw as recited in claim 1, wherein said axis of twist is aligned with the edge of said tab opposite to said edge facing in the direction of rotation of said screw for removal thereof.

3. A screw as recited in claim 1, wherein said axis of twist is positioned intermediate the respective radially extending edges of each tab.

4. A screw is recited in claims 1, 2 or 3, wherein said flange is inclined to a plane extending normally to the axis of rotation at an angle equal to about 5 degrees through about 30 degrees.

5. A screw as recited in claim 4, wherein said angle is about 15 degrees.

6. A screw as recited in claims 1, 2 or 3, wherein said tab is twisted about said axis of twist by an angle up to about 45 degrees.

7. A screw as recited in claim 6, wherein said angle of twist is about 10 degrees.

8. A screw as recited in claim 1, wherein the respective ends of said edges of said tabs essentially lie in a single plane extending normally to the axis of rotation of said screw.

* * * * *